United States Patent
Tsai et al.

(10) Patent No.: US 11,034,432 B2
(45) Date of Patent: Jun. 15, 2021

(54) FLAP SUPPORT MECHANISM—C BAR

(71) Applicant: The Boeing Company, Chicago, IL (US)

(72) Inventors: Kevin R. Tsai, Seattle, WA (US);
Bruce A. Dahl, Kent, WA (US);
Gregory M. Santini, Bothell, WA (US);
Kyle A. Johnson, Fall City, WA (US);
Seiya Sakurai, Seattle, WA (US);
Stephen R. Amorosi, Seattle, WA (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 16/172,750

(22) Filed: Oct. 27, 2018

(65) Prior Publication Data
US 2020/0130809 A1    Apr. 30, 2020

(51) Int. Cl.
*B64C 3/38*   (2006.01)
*B64C 5/10*   (2006.01)
*F16H 21/44*  (2006.01)
*F16H 51/00*  (2006.01)
*B64C 5/08*   (2006.01)
*F16H 25/22*  (2006.01)

(52) U.S. Cl.
CPC ............. *B64C 5/10* (2013.01); *B64C 3/38* (2013.01); *B64C 5/08* (2013.01); *F16H 21/44* (2013.01); *F16H 25/2204* (2013.01); *F16H 51/00* (2013.01)

(58) Field of Classification Search
CPC .... B64C 3/44; B64C 3/50; B64C 3/16; B64C 3/18; B64C 3/20
See application file for complete search history.

(56) References Cited

U.S. PATENT DOCUMENTS

| | | | |
|---|---|---|---|
| 2,700,516 A * | 1/1955 | Nazir | B64C 9/146 244/212 |
| 4,283,029 A * | 8/1981 | Rudolph | B64C 9/18 244/215 |
| 7,243,881 B2 * | 7/2007 | Sakurai | B64C 9/20 244/212 |

* cited by examiner

*Primary Examiner* — Richard G Davis
(74) *Attorney, Agent, or Firm* — Felix L. Fischer

(57) ABSTRACT

A trailing edge flap actuation mechanism has a flap drive link with a first end pivotally coupled to a fore flap structure of a flap and a second end pivotally coupled to an underwing support structure. An aft tension link has a leading end pivotally coupled proximate an aft end of the underwing support structure and a trailing end coupled to a mid-section structure of the flap. An actuator, when actuated, rotates the flap drive link about a first pivot axle to move the flap between a retracted position and a deployed lowered position. The actuator, including a ball-screw drive shaft having a universal joint, is positioned in a cove above the underwing support structure whereby the extent that the underwing support structure protrudes below the wing is reduced.

20 Claims, 11 Drawing Sheets

FLAP SUPPORT MECHANISM—C BAR

This application is copending with application Ser. No. 16/172,748 filed on Oct. 27, 2018 and entitled WING FLAP MECHANISM FOR HIGH FOWLER, DROOPING SPOILERS AND HIGH EFFICIENCY.

BACKGROUND INFORMATION

Field

Embodiments of the disclosure relate generally to the field of aircraft flap extension systems and, more particularly to a trailing edge flap mechanism employing a first flap link coupled to a fore flap structure and pivoting on an underwing support structure and a second flap link coupled to a mid-section flap structure an pivoting on an aft end of the underwing support structure for increased camber earlier in flap stroke movement.

Background

Aircraft employ flaps which increase camber of the wings for enhanced aerodynamic efficiency in take-off and landing. Various mechanical arrangements have been developed to deploy the flaps from retracted to extended positions. Prior art solutions for large commercial aircraft may have high actuator loads which require complex mechanical arrangements and large actuators or transmission systems which may increase aircraft weight, cost and complexity.

SUMMARY

Exemplary embodiments provide a trailing edge flap actuation mechanism having a flap drive link with a first end pivotally coupled to a fore flap structure of a flap and a second end pivotally coupled to an underwing support structure. An aft tension link has a leading end pivotally coupled proximate an aft end of the underwing support structure and a trailing end coupled to a mid-section structure of the flap. An actuator, when actuated, rotates the flap drive link about a first pivot axle to move the flap between a retracted position and a deployed lowered position. The actuator, including a ball-screw drive shaft with a universal joint, is positioned in a cove above the underwing support structure whereby the extent that the underwing support structure protrudes below the wing is reduced.

The implementations herein provide a method for deployment of a flap wherein a flap drive link is pivotally engaged with a drive axle to a fore flap structure with the flap drive link rotatable about a first pivot axle in an underwing support structure. A ball nut pivotally carried by the flap drive link is engaged with a ball screw shaft of an actuator. The flap drive link is rotated from an initial acute drive angle. An aft tension link is rotatably engaged to an aft end of the underwing support structure with a second pivot axle at an obtuse initial drag angle and pivotally engaged at a trailing end to a mid-section structure of the flap with a drive reaction axle. A connector bar between the drive axle and reaction axle is created with the flap structure. Rotating the flap drive urges the drive axle and, through the connector bar the reaction axle, to rotate the aft tension link from the initial obtuse drag angle for enhanced increasing camber.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The implementations described herein provide a trailing edge flap mechanism which maintains streamwise motion employing underwing beams incorporating a stacked actuator arrangement. The streamwise motion simplifies the interaction between the inboard and outboard flap, which both travel straight aft without interference, to simplify seal design. The stacked actuator makes use of the space already reserved for the flap support with the actuator gearbox residing in the trailing edge cove thereby reducing fairing depth. A "C" bar configuration of a flap drive link coupled to a fore flap structure and pivoting on an underwing support structure and an aft tension link coupled to a mid-section flap structure and pivoting on an aft end of the underwing support structure allows the actuator to be a linear ball screw with greater efficiency and less weight than a rotary actuator. The "C" bar mechanism also enables trailing edge variable camber (TEVC) to be incorporated. The trailing edge flap mechanism is able to change the angle of the flap without adding significant chord to the wing.

Figure 1A:
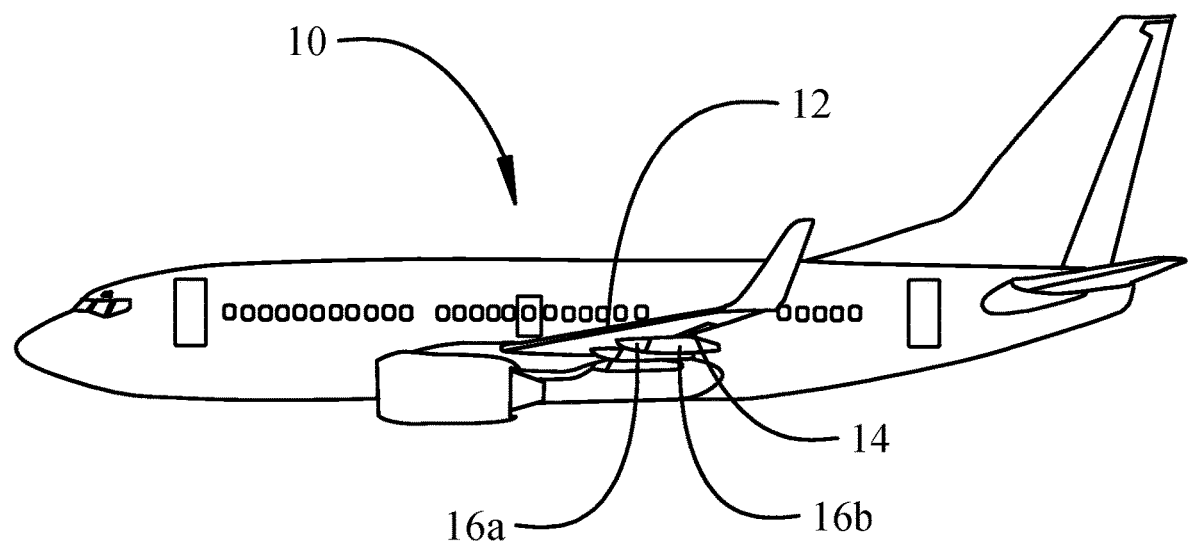
FIG. 1A is a representation of an aircraft in which the implementations disclosed herein may be employed.
Figure 1B:
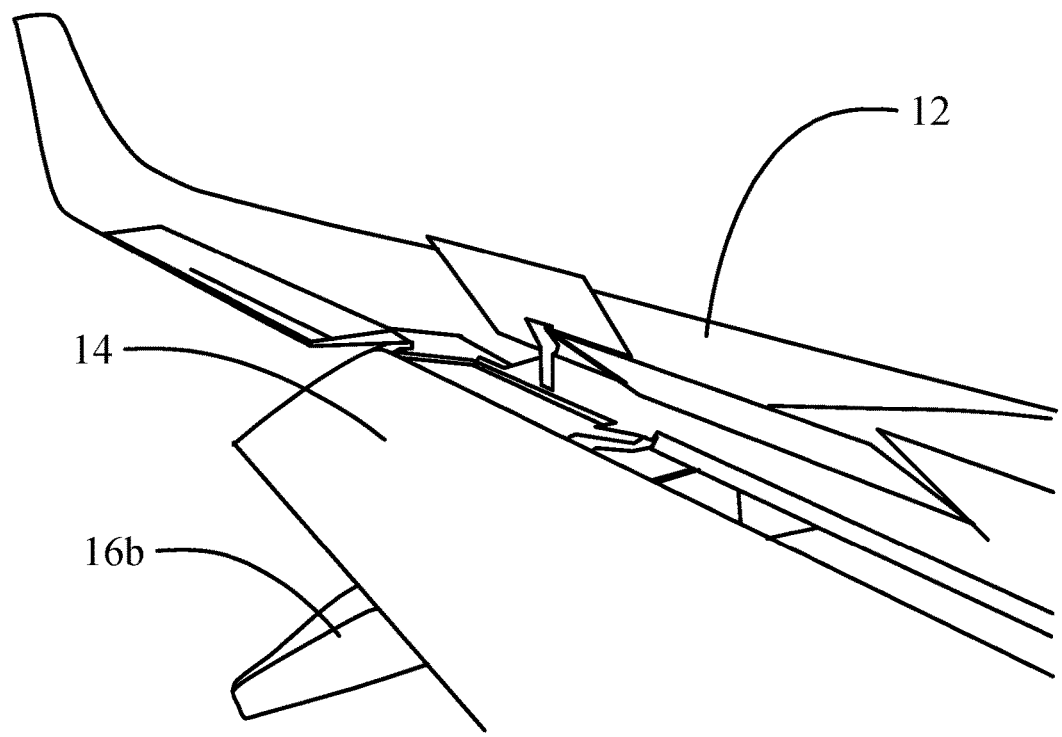
FIG. 1B is a detailed pictorial representation of the wing and flap of the aircraft of FIG. 1A.
Figure 1C:
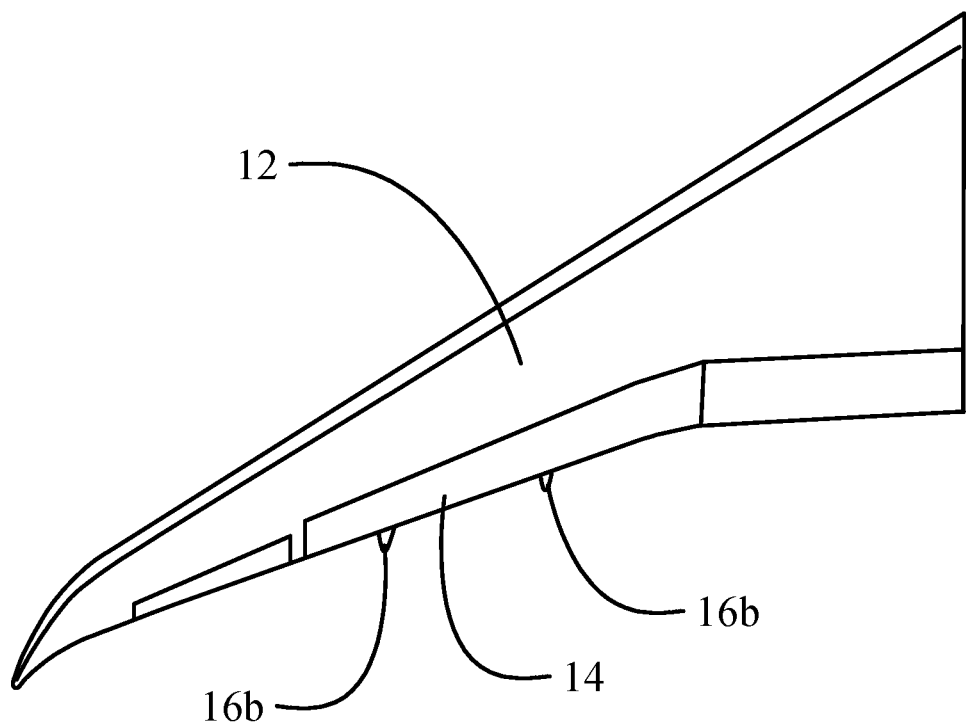
FIG. 1C is a top view of the wing and flaps of FIG. 1B.

Referring to the drawings, FIGS. 1, 1B and 1C depict an aircraft 10 having a wing 12 with operating flaps 14. The flaps 14 are engaged to the wing 12 at multiple attachment points with underwing structures partially housed within fixed fairings 16a and movable fairings 16b. Extension of the flaps 14 to enhance aerodynamic performance during takeoff and landing is accomplished with a trailing edge flap mechanism 17 causes the flaps 14 and movable fairings 16b to rotate downward relative to the wing 12 as seen in FIG. 1B.

Figure 2:
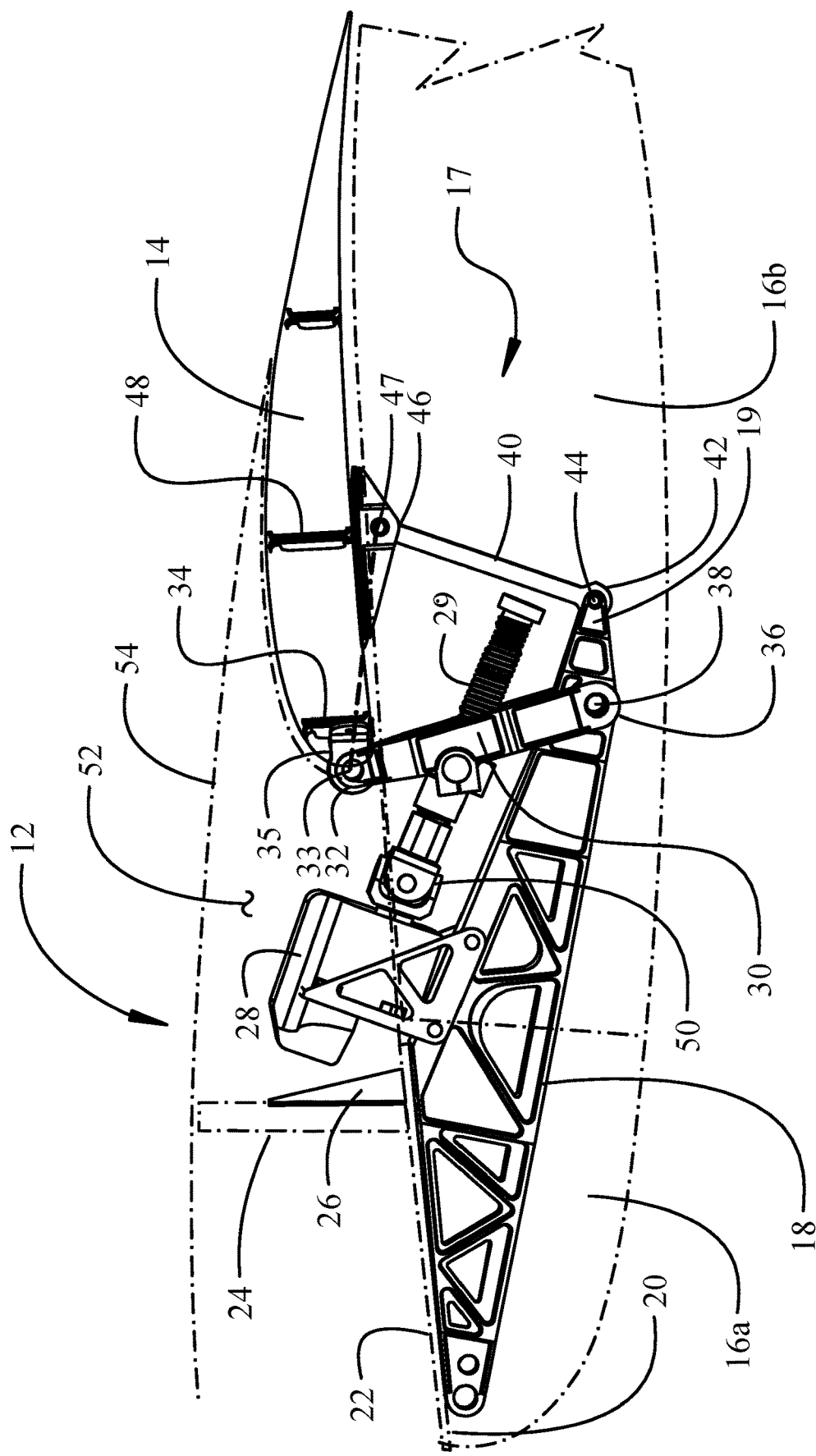
FIG. 2 is a side view of an exemplary implementation of the trailing edge flap mechanism.

As seen in FIG. 2, at each attachment point an underwing beam (UWB) 18 provides fixed wing structure to attach the flaps 14 and associated operating support links and actuators (to be described in greater detail subsequently) to the wing 12. The UWB 18 is attached to the wing 12 on a lower surface 20 formed by a wing lower skin 22 and partially housed within the fixed fairing 16a. The movable fairing 16b encases the UWB 18 and the trailing edge flap mechanism 17 in the retracted position and rotates downward as the flap 14 is deployed. A rear spar 24 extends upward within the wing 12 from the wing lower skin 22 and the UWB 18 is attached to the rear spar with attachment brackets 26.

The flap 14 is deployed by a flap drive link 30 with a first end 32 pivotally coupled with a drive axle 33 to a fore flap structure 34, which may be a front spar or D section spar, with a pivot bracket 35. A second end 36 of the flap drive link 30 is pivotally coupled to the UWB 18 with a first pivot axle 38. An aft tension link 40 has a leading end 42 pivotally coupled with a second pivot axle 44 proximate an aft end 19 of the UWB 18. A trailing end 46 of the aft tension link 40 is pivotally coupled with a reaction axle 47 to a mid-section structure 48 of the flap 14. The structure of the flap connects the pivot point (drive axle 33) of the first end 32 of the flap drive link 30 and the pivot point (drive reaction axle 47) of the trailing end 46 of the aft tension link 40 providing a connecting bar, generally depicted as element 49. The flap drive link 30, connector bar 49 and aft tension link 40 create a flexing C-bar structure opening downward.

Figure 3:
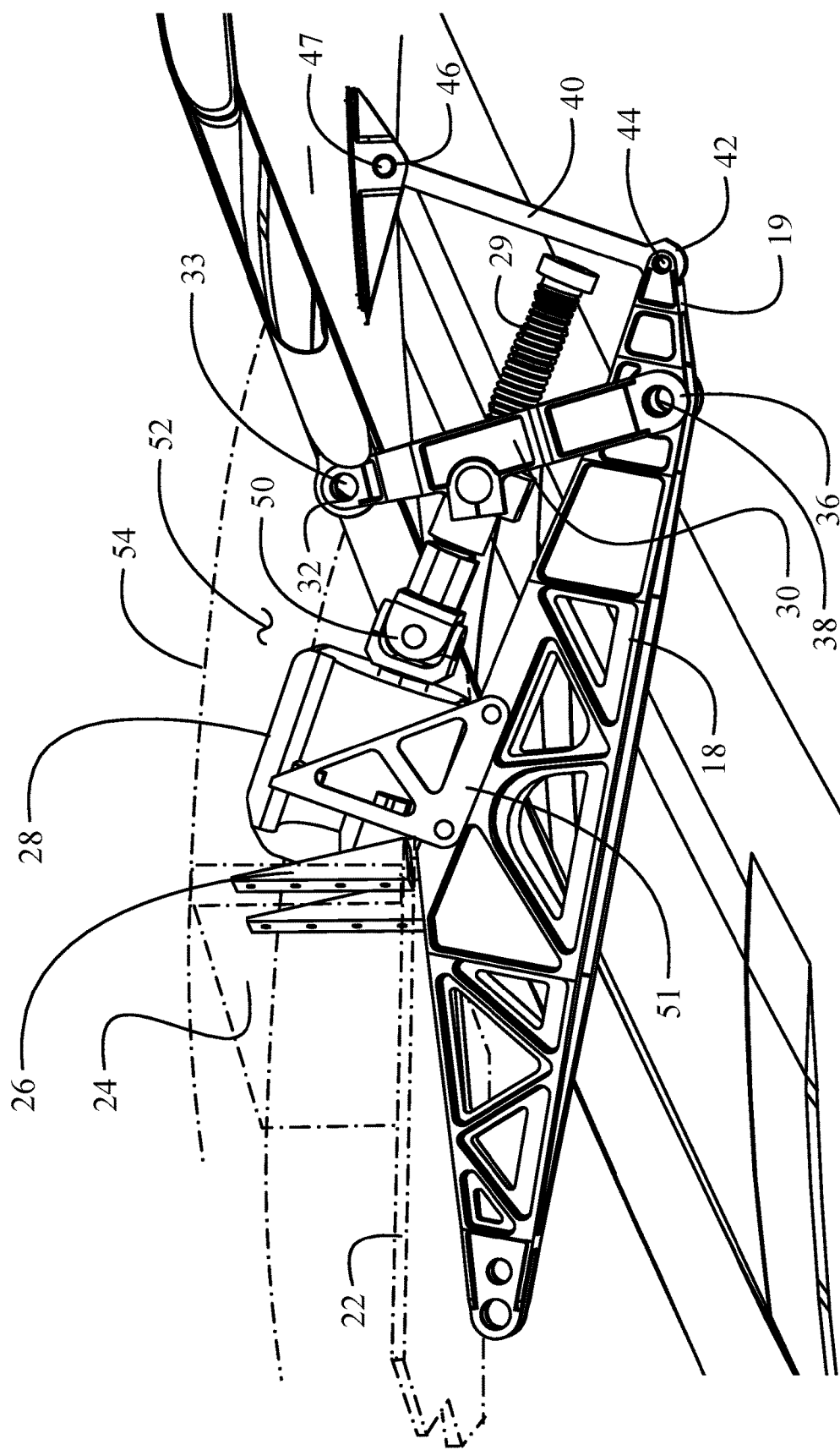
FIG. 3 is a pictorial representation of the exemplary implementation of the exemplary implementation with the attached flap, and wing structure shown in phantom.
Figure 4:
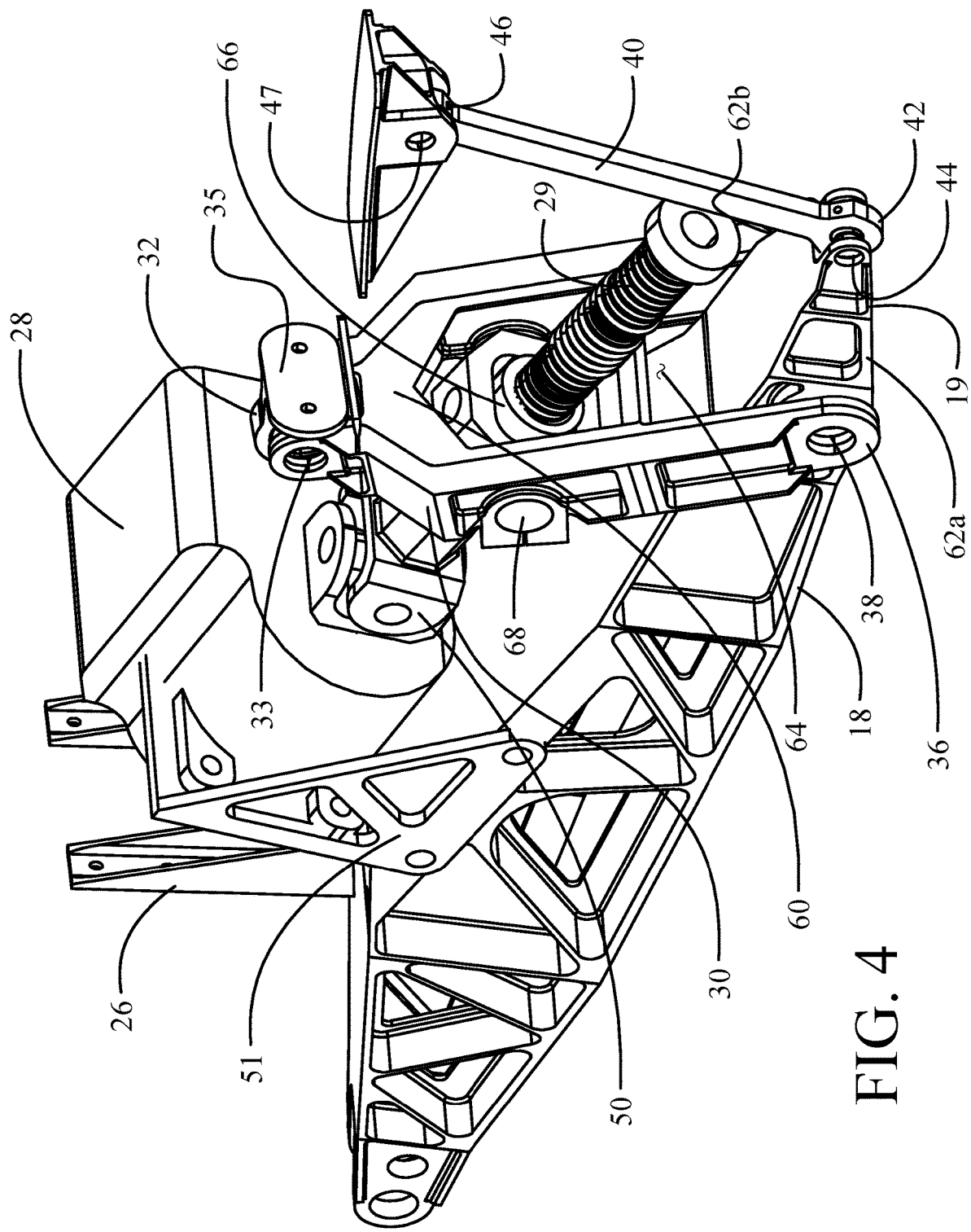
FIG. 4 is a pictorial detailed representation of the elements of the exemplary implementation.

As seen in greater detail in FIGS. 3 and 4, an actuator 28 rotates the flap drive link 30 about the first pivot axle 38 to move the flap 14 between a retracted position and a deployed lowered position, as will be described in greater detail subsequently. The actuator 28, mounted on brackets 51 to the UWB 18, is positioned in a cove 52 (best seen in FIG. 2) above the UWB 18 generally defined by the rear spar 24, wing upper skin 54 and the UWB upper surface 56. The ability for the actuator to be housed in the cove 52 reduces the extent that the underwing support structure protrudes below the wing. A ball-screw drive shaft 29 is operably connected to the actuator 28 with a universal joint 50. For the exemplary implementation as shown, the flap drive link 30 has a clevis 60 engaging the first pivot axle 38 on opposite sides 62*a* and 62*b* of the UWB 18. Clevis 60 terminates at the first end 32 of the flap drive link 30. An aperture 64 in the clevis 60 receives the ball screw shaft 29 and the arms pivotally support a ball nut 66 on pins 68 to operably engage the ball screw shaft 29.

Figure 5:
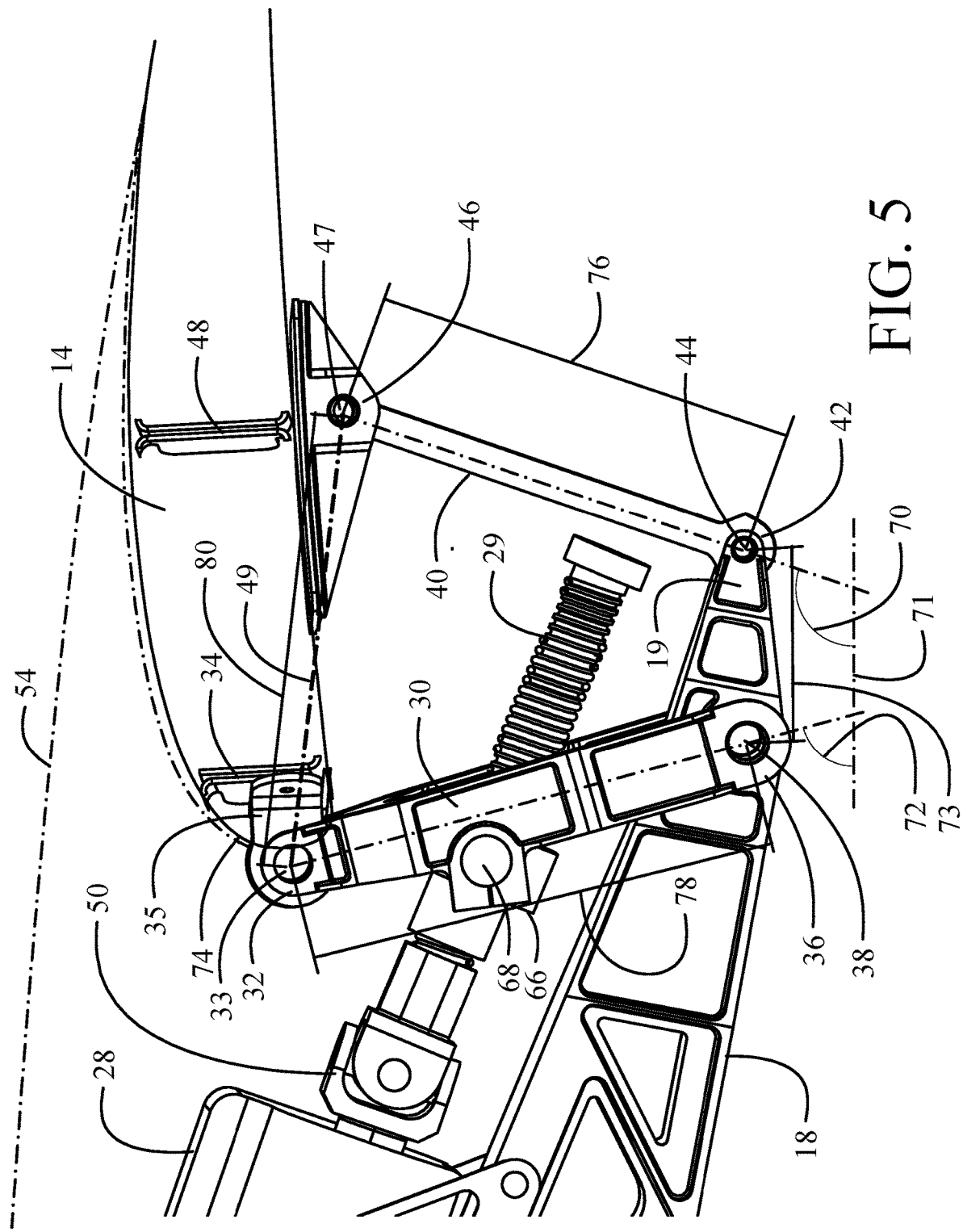
FIG. 5 is a detailed side view of the elements of the trailing edge flap mechanism.

The actuator 28, when actuated, rotates the ball screw shaft 29 through universal joint 50 causing translation of the ball nut 66 thereby urging rotation of the flap drive link 30 about the first pivot axle 38. The connector bar 49 urges the trailing end 46 of the aft tension link 40 rearward causing the aft tension link to rotate about the second pivot axle 44 drawing the flap 14 downward. As seen in FIG. 5, the initial drag angle 70 of the aft tension link 40 is predetermined to be obtuse with respect to the streamwise direction (indicated generally by axis 71). The initial position of the aft tension link 40 in the retracted position of the flap 14 the drag angle 70 is in a range of approximately 100°-120°. This causes initial rotation of the flap drive link 30 and associated motion of the aft tension link 40 pivoting on second pivot axle 44 to create greater camber in the flap more rapidly. Having the aft tension link 40 disposed at a predetermined obtuse drag angle, increases the extent of flap rotation to provide increased camber earlier in flap stroke movement. The flap drive link 30 has an initial drive angle 72 which is acute relative to the streamwise direction and urges the fore flap structure 34 and flap leading edge 74 upward during initial rotation which further enhances the camber of the flap 14. An exemplary initial rotational angle of no greater than 75° provides a full 15° of rotation by the flap drive link 30 while substantially holding the leading edge 74 of the flap 14 without downward motion thereby enhancing camber while minimizing chord growth during initial flap deflection. Reduction in chord growth may be particularly applicable for trailing edge variable camber (TEVC) operations. The TEVC will operate by deflecting the trailing edge flaps in 0.5° increments while in cruise and the aggressive droop provided by disclosed trailing edge flap mechanism 17 herein will enhance effectiveness.

For an exemplary implementation, the length 76 of aft tension link 40 is between 80-90% of the length 78 of flap drive link 30. Connecting bar 49 has a length 80 at least equal to or greater in length than the flap drive link 30 creating greater rotation of aft tension link 40 about the fixed second pivot axle 44 than rotation of the flap drive link about fixed first pivot axle 38 during motion of the drive axle 33 and drive reaction axle 47 which pivotally engage the first end 32 of the flap drive link 30 and trailing end 46 of the aft tension link 40, respectively. In the exemplary implementation, for deployment of the flap 14 from a fully retracted to a fully deployed position (as will be described and shown with respect to FIGS. 6A-6D), the drive angle of flap drive link increases during rotation of the flap from the retracted to fully deployed position by approximately 50°-60°, while the drag angle of the aft tension link increases by approximately 60°-70°. The open end of the C bar configuration is created by a separation distance 73 between the first and second pivot axles 38,44 of no more than 40% of the length 78 of flap drive link 30 and connector bar 49 to establish the predetermined relative initial angle of rotation and initial drag angle.

Figure 6A:
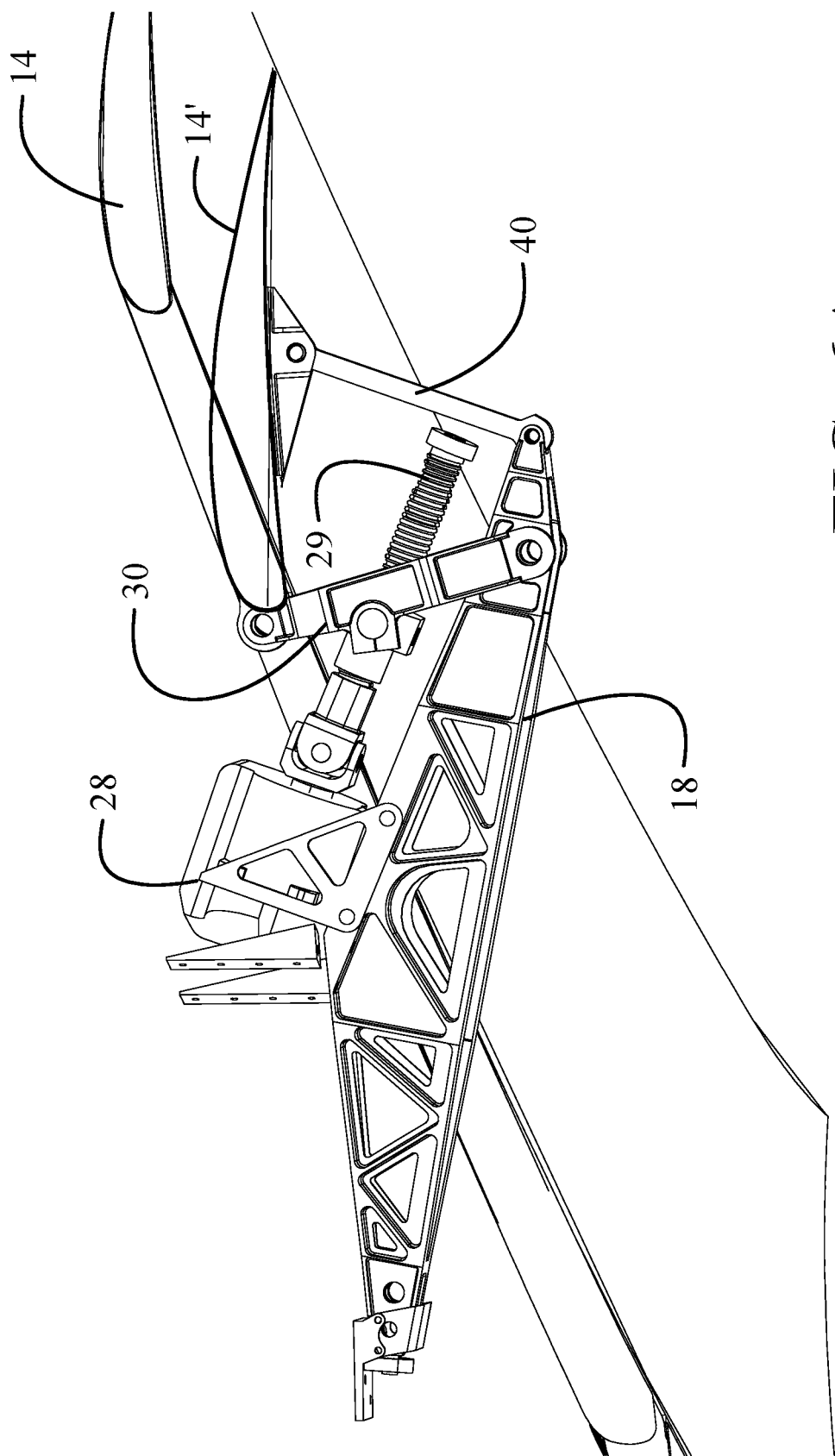
FIGS. 6A-6D are pictorial representations of the exemplary implementation in various deployed positions in the range of deployment.
Figure 6B:
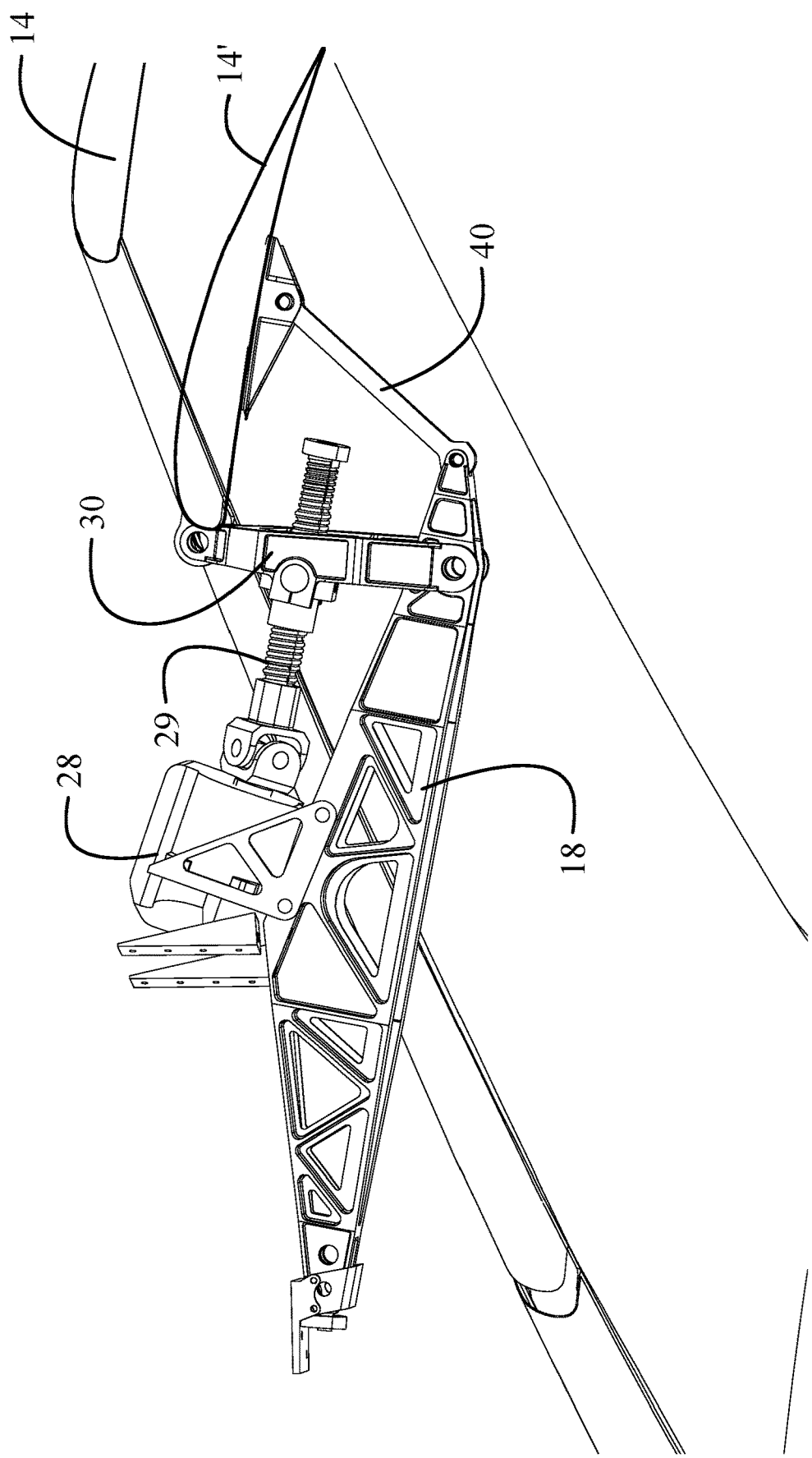
Figure 6C:
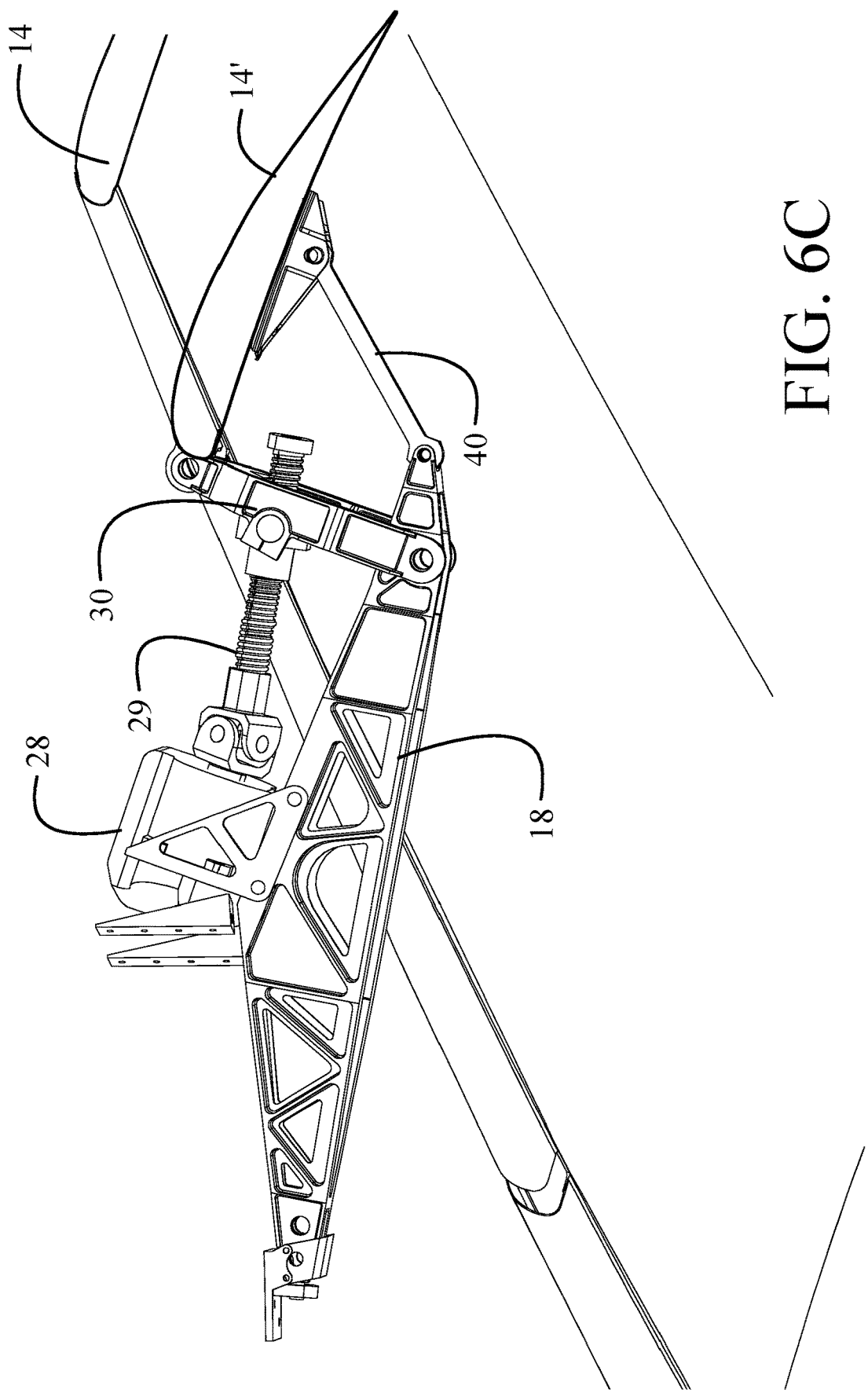
Figure 6D:
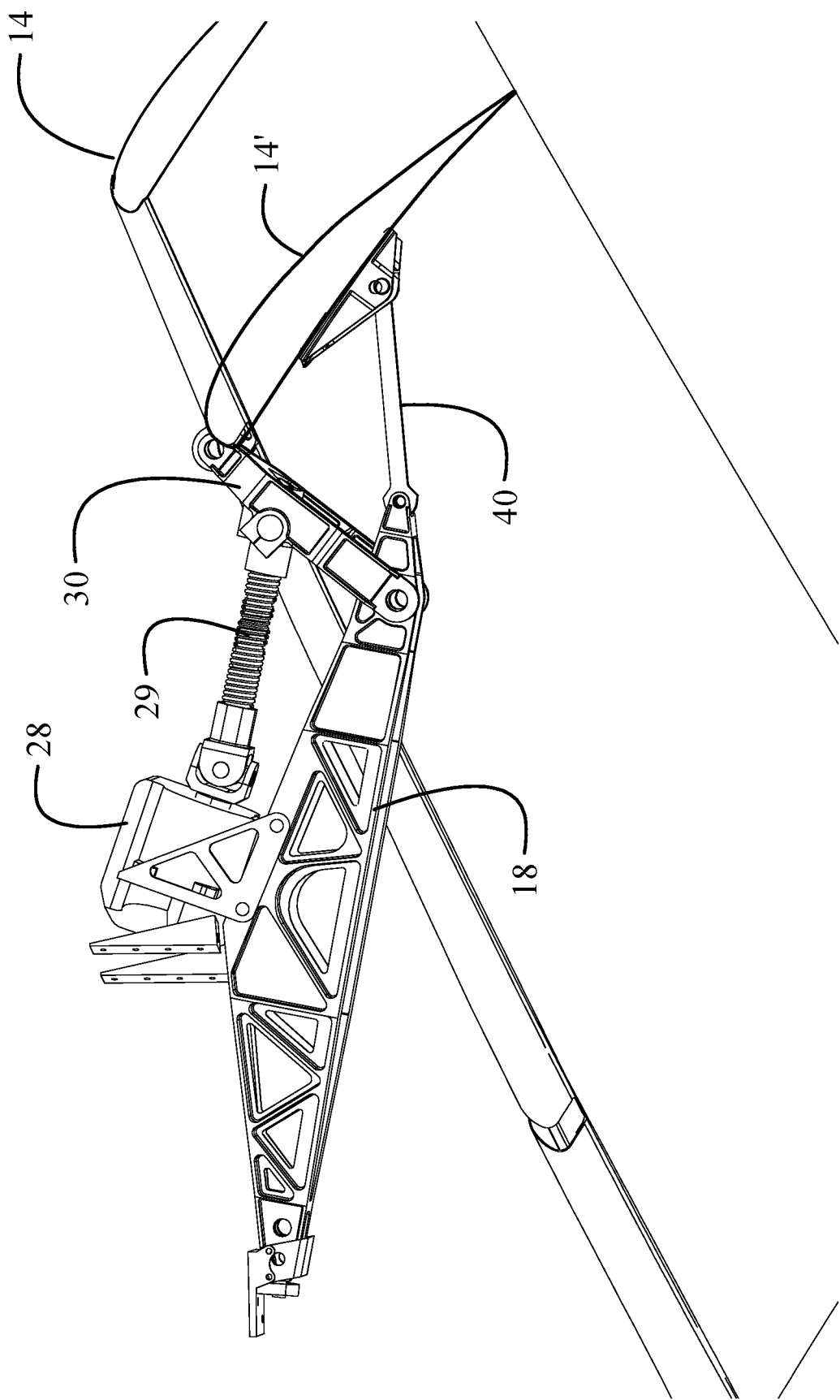

Relative positioning of the elements of the trailing edge flap mechanism 17 during deployment of the flap 14 is shown in FIGS. 6A-6D. In FIG. 6A, the flap 14 is in the fully retracted position with the flap drive link 30 and aft tension link 40 in their initial positions as described with respect to FIG. 5. In FIG. 6B, the rotational angle of the flap drive link 30 is substantially orthogonal to the streamwise direction, having rotated approximately 15°. As seen, the ball nut 66 has been elevated by the motion of the flap drive link 30, rotating on pins 68 and elevating the ball screw shaft 29 with the universal joint 50 maintaining rotational integrity. Camber of the flap as seen in cross sectional profile 14' is significant compared to the flap position in FIG. 6A, with the flap 14 deployed approximately 15°. As seen in FIG. 6C, once the rotation angle of flap drive link 30 becomes obtuse with respect to the streamwise direction, further rotation of the flap drive link 30 draws the drive axle 33 downward urging the pivot bracket 35 and fore flap structure 34 to contribute to the camber of the flap with the flap 14 deployed approximately 25°. FIG. 6D demonstrates the camber of the entire flap 14 when fully deployed at approximately 40°. The differential in total change in rotation angle and drag angle between the flap drive link 30 and aft tension link 40 as described with respect to FIG. 5 is demonstrated.

Figure 7:
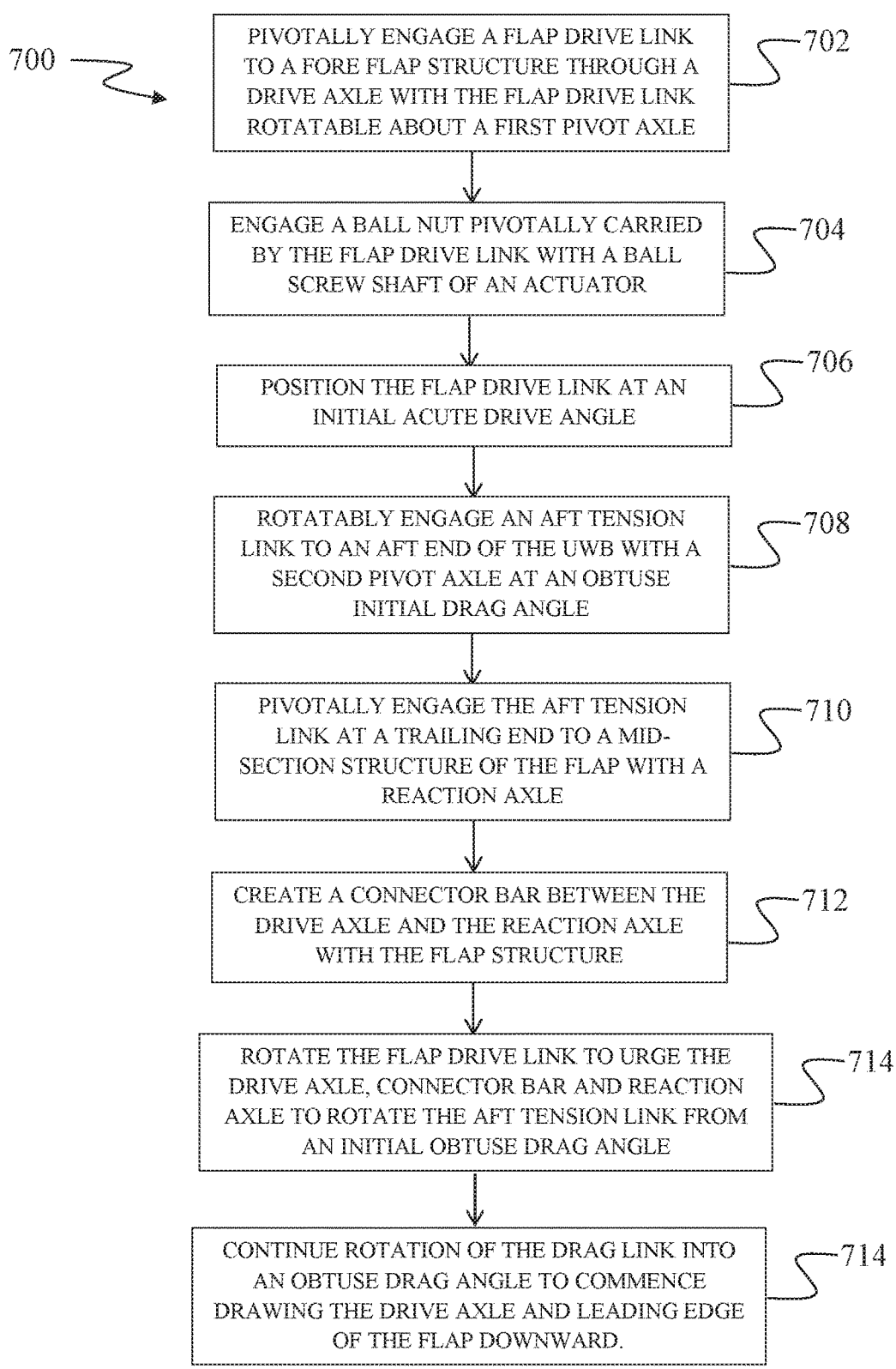
FIG. 7 is a flow chart of a method for flap deployment using the exemplary implementation.

The implementation disclosed herein provides a method 700 for deployment of a flap as shown in FIG. 7. A flap drive link 30 is pivotally engaged with a drive axle 33 to a fore flap structure 34 and rotatable about a first pivot axle 38 in an underwing support structure, step 702. An actuator 28 engages a ball nut 66 pivotally carried by the flap drive link with a ball screw shaft 29, step 704, with the flap drive link 30 positioned at an initial acute drive angle 72, step 706. An aft tension link 40 is rotatably engaged to an aft end of the underwing support structure with a second pivot axle 44 at an obtuse initial drag angle, step 708, and pivotally engaged at a trailing end 46 to a mid-section structure 48 of the flap with a drive reaction axle 47, step 710. The flap structure creates a connector bar 49 between the drive axle 33 and reaction axle 47, step 712. Rotation of the flap drive link 30 urges the drive axle 33 and, through the connector bar 49, the reaction axle 47 to rotate the aft tension link from the initial obtuse drag angle 70 for enhanced increasing camber, step 714. Continuing rotation of the flap drive link 30 into an obtuse drive angle commences drawing the drive axle 33 and leading edge 74 of the flap 14 downward, step 716.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A trailing edge flap actuation mechanism, comprising:
   a flap drive link with a first end pivotally coupled to a fore flap structure of a flap rotatable downward from a wing and a second end pivotally coupled to an underwing support structure;
   an aft tension link, with a leading end pivotally coupled proximate an aft end of the underwing support structure, and a trailing end coupled to a mid-section structure of the flap; and
   an actuator which, when actuated, rotates the flap drive link about a first pivot axle to move the flap between a retracted position and a deployed lowered position, wherein the actuator includes a ball-screw drive shaft having a universal joint and is positioned in a cove above the underwing support structure whereby protrusion of the underwing support structure below the wing is reduced.

2. The trailing edge flap actuation mechanism as defined in claim 1, wherein the aft tension link is initially disposed at a predetermined drag angle, such that flap rotation from a retracted position of the flap is increased to provide increased camber earlier in flap stroke movement.

3. The trailing edge flap actuation mechanism as defined in claim 2 wherein the drag angle is obtuse in the retracted position of the flap.

4. The trailing edge flap actuation mechanism as defined in claim 3 wherein in the drag angle is between 100° and 120° in the retracted position.

5. The trailing edge flap actuation mechanism as defined in claim 4 wherein the flap drive link has an acute drive angle in a retracted position of the flap.

6. The trailing edge flap actuation mechanism as defined in claim 5 wherein the drive angle is no greater than 75° in the retracted position.

7. The trailing edge flap actuation mechanism as defined in claim 2 wherein structure of the flap provides a connector bar between the first end of the flap drive link and the trailing end of the aft tension link.

8. The trailing edge flap actuation mechanism as defined in claim 7 wherein a length of the connector bar is at least equal to or greater than a flap drive link length.

9. The trailing edge flap actuation mechanism as defined in claim 8 wherein an aft tension link length is between 80% and 90% of the flap drive link length.

10. The trailing edge flap actuation mechanism as defined in claim 6 wherein the drag angle increases by 60°-70° during rotation of the flap from the retracted position to a fully deployed position.

11. The trailing edge flap actuation mechanism as defined in claim 10 wherein the drive angle increases by 50°-60° during rotation of the flap from the retracted position to a fully deployed position.

12. The trailing edge flap actuation mechanism as defined in claim 1 wherein the flap drive link comprises a clevis having an aperture, and further comprising a ball nut pivotally engaged within the aperture and operationally receiving the ball screw shaft.

13. The trailing edge flap actuation mechanism as defined in claim 7 further comprising:
   a pivot bracket engaged to the fore flap structure and receiving a drive axle coupled to the first end of the flap drive link; and,
   a drive reaction axle coupling the trailing end of the aft tension link to the mid-section structure, said connector bar extending between the drive axle and the reaction axle.

14. The trailing edge flap actuation mechanism as defined in claim 9 wherein the aft tension link is pivotally engaged to the aft end of the underwing support structure by a second pivot axle and the first pivot axle and second pivot axle have a separation distance of no more than 40% of the flap drive link length.

15. A method for deployment of a flap comprising:
   pivotally engaging a flap drive link with a drive axle to a fore flap structure at an initial acute drive angle, said flap drive link rotatable about a first pivot axle in an underwing support structure;
   engaging a ball nut pivotally carried by the flap drive link with a ball screw shaft of an actuator;
   rotatably engaging an aft tension link to an aft end of the underwing support structure with a second pivot axle at an obtuse initial drag angle;
   pivotally engaging said aft tension link at a trailing end to a mid-section structure of the flap with a drive reaction axle;
   creating a connector bar between the drive axle and reaction axle with the flap structure; and,
   rotating the flap drive link and urging the drive axle and, through the connector bar the reaction axle, rotating the aft tension link from the initial obtuse drag angle for enhanced increasing camber.

16. The method as define in claim 15 further comprising;
   continuing rotation of the flap drive link into an obtuse drive angle; and
   drawing the drive axle and leading edge of the flap downward.

17. The method as defined in claim 16 wherein the step of rotating the flap drive link from an initial acute drive angle comprises rotating the flap drive link from an initial drive angle of no greater than 75° by between 50° and 60°.

18. The method as defined in claim 17 wherein the step of rotating the aft tension link from the initial obtuse drag angle comprises rotating the aft tension link from an initial drag angle of between 100° and 120° by between 60° and 70°.

19. The method as defined in claim 18 wherein a connector bar length is equal to or greater than a flap drive link length and an aft tension link length is between 80% and 90% of the flap drive link length.

20. The method as defined in claim 19 wherein the first and second pivot axles have a separation distance of no more than 40% of the flap drive link length.

* * * * *